ent Office 2,787,641
Patented Apr. 2, 1957

2,787,641

DIMETHYLHALOFORMYLCYCLOPENTANONES

Newman M. Bortnick, Oreland, Pa., assignor to Rohm & Haas Company, Philadelphia, Pa., a corporation of Delaware No Drawing. Application March 28, 1955,
Serial No. 497,435

12 Claims. (Cl. 260—544)

This invention relates to stable dimethylhaloformylcyclopentanones and also to a method for their preparation.

The compounds of the present invention may be represented by the formula

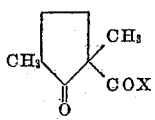

in which X is a halogen atom having an atomic weight of about 35.5 to 79.9, namely chlorine or bromine. Chlorine is a somewhat preferred representation of X, largely because of cost and availability considerations.

The present compounds are prepared by the dehydrohalogenation and cyclization of $\alpha,\alpha'$-dimethyladipoyl halide in the presence of a tertiary amine in a manner to be more fully explained hereinafter.

The reactant, $\alpha,\alpha'$-dimethyladipoyl halide, may be prepared by reacting $\alpha,\alpha'$-dimethyladipic acid with thionyl halide until the evolution of hydrogen halide and sulfur dioxide ceases. Thionyl halide and $\alpha,\alpha'$-dimethyladipic acid are well known compounds, the latter being readily obtained by hydrolysis of the hydrogenated dimer of methyl methacrylate. The formation of $\alpha,\alpha'$-dimethyladipoyl halide may be clearly understood from the following preparation in which parts by weight are employed.

*Preparation*

There was introduced into a three-neck flask, equipped with a thermometer, stirrer, and reflux condenser, 348 parts of $\alpha,\alpha'$-dimethyladipic acid. Thionyl chloride was added portionwise until 430 parts had been introduced. The reaction mixture was heated on a steam bath. The mixture refluxed vigorously and evolution of hydrogen chloride and sulfur dioxide occurred. The mixture was held at reflux for five hours and then allowed to cool to and stand at room temperature for two days. The reaction mixture was distilled and the product collected at 109° C./6 mm. to 124° C./7 mm. The product was analyzed for chlorine content and gave a result of 33.80% (33.95% theoretical). The product was identified as $\alpha,\alpha'$-dimethyladipoyl chloride.

The dehydrohalogenation and cyclization of $\alpha,\alpha'$-dimethyladipoyl halide is accomplished through the agency of a tertiary amine preferably of no more than twenty carbon atoms. The preferred tertiary amines include alkylamines of three to twenty carbon atoms, arylalkylamines of eight to twenty carbon atoms, and heterocyclic amines of five to twenty carbon atoms. Other amines may be used satisfactorily, the critical restriction being that the amine be tertiary and contain no more than twenty carbon atoms.

Typical of the preferred tertiary amines that may be employed include trimethylamine, triethylamine, tripropylamine, tributylamine, triamylamine, trihexylamine, dimethylethylamine, dimethyloctadecylamine, diethylmethylamine, dipropylethylamine, diethylpropylamine, dipropylbutylamine, dibutylpropylamine, diamylpropylamine, dihexylethylamine, hexyldiethylamine, hexyldibutylamine, hexyldiamylamine, hexyldiheptylamine, dihexylamylamine, heptyldiamylamine, octyldimethylamine, octyldiethylamine, octyldipropylamine, octyldibutylamine, octyldiamylamine, nonyldimethylamine, nonyldiethylamine, dinonylethylamine, methylethylbutylamine, methylethylpentylamine, methylethyldecylamine, ethylbutyldecylamine, propylamyldecylamine, propylamyldodecylamine, butylamyldecylamine, butylhexyloctylamine, dimethylaniline, methylethylaniline, diethylaniline, propylbutylaniline, butylhexylaniline, diamylaniline, amyloctylaniline, hexyloctylaniline, benzylmethylaniline, benzylpropylaniline, benzylbutylaniline, benzylheptylaniline, dimethylnaphthylamine, diethylnaphthylamine, methylethylnaphthylamine, dipropylnaphthylamine, dibutylnaphthylamine, diamylnaphthylamine, pyridine, methylpyridine, butylpyridine, octylpyridine, decylpyridine, tetradecylpyridine, quinoline, methylquinoline, butylquinoline, octylquinoline, methylpyrrolidine, ethylpyrrolidine, butylpyrrolidine, octylpyrrolidine, dodecylpyrrolidine, methylpiperidine, ethylpiperidine, propylpiperidine, butylpiperidine, octylpiperidine, dodecylpiperidine, tetradecylpiperidine, methylmorpholine, ethylmorpholine, butylmorpholine, amylmorpholine, octylmorpholine, dodecylmorpholine, and tetradecylmorpholine.

It is somewhat preferred to employ tertiary amines of lower carbon content largely because of availability, cost, and convenience. It is also considered advantageous to employ the smaller sized tertiary amines because, since the hydrogen halide liberated in the present reaction unites with the tertiary amine to form the corresponding amine hydrohalide, more desirable weight ratios of reactants to products are obtained. This, however, is not a matter of critical significance. Likewise, there is no critical limitation on the spatial arrangement of the tertiary alkylamines that may be employed, it being satisfactory to employ the normal, iso-, tertiary, or other branched chain configurations.

The reactants of the present invention are liquids and a solvent is not necessary. However, it is usually convenient to employ an inert, volatile, organic solvent, particularly since the tertiary amine hydrohalide formed as a by-product is a solid. The presence of a solvent facilitates the separation of the liquid product from the solid by-product. The solvent is easily removed, when desired, by evaporation or distillation. Suitable for use as a solvent are benzene, toluene, xylene, ether, naphtha, pentane, hexane, and the like.

The instant reaction is usually exothermic and vigorous. It is preferable, particularly in the early stages of the reaction, to employ convenient methods of cooling the reaction system such as by the use of an ice bath in order to maintain a moderate reaction speed. This is especially so when a low boiling tertiary amine is being used. Also, it is frequently convenient to add slowly the $\alpha,\alpha'$-dimethyladipoyl halide to the tertiary amine in order to minimize some of the somewhat undesirable effects of the exothermic nature of the reaction.

Temperatures in the range of about 0° C. to the reflux temperature of the reaction mixture are advantageously employed. Usually temperatures up to about 100° C. are somewhat preferred. Temperatures in the lower part of the above range down to about 0° C. are quite satisfactory for the present purposes even though extensive cooling practices are frequently required to offset the usual exothermic nature of the reaction. When X, in the formula of the present compounds, represents bromine the temperatures in the lower part of the stated range are somewhat preferred.

Atmospheric pressures are usually employed. However, if desired, subatmospheric or superatmospheric pressures may be satisfactorily used, particularly if the contemplated tertiary amine and reaction temperature suggest such conditions.

The present reaction is essentially an equimolecular one. Although such is the case it is usually the practice to employ an excess of the tertiary amine in order to assure completeness of reaction. At the conclusion of the reaction the solid tertiary amine hydrohalide is separated by filtration and excess amine and solvent, if any, may be removed by evaporation or distillation, as desired. The formed hydrochloride is readily reclaimed. The liquid product is preferably isolated by distillation at pressures conveniently less than atmospheric. The products of this invention are clear liquids that are remarkably stable and are valuable for treating and stabilizing protein materials such as wool and leather. They serve as tanning agents for leather. These compounds are useful in analytical procedures for the detection and identification of amines and water.

The method of preparation of the compounds of the present invention may be more fully understood from the following illustrative example in which parts by weight are used throughout.

*Example*

A solution of 151.5 parts of triethylamine in 500 parts of anhydrous diethyl ether was introduced into a reaction vessel equipped with a stirrer, a thermometer, and a reflux condenser. There was then added dropwise, with occasional cooling by use of an ice bath, α,α'-dimethyladipoyl chloride until 302 parts had been introduced. The reaction mixture was stirred for fifteen minutes after all of the α,α'-dimethyladipoyl chloride had been added. The temperature, during this time, ranged between 25 to 38° C. The reaction mixture was allowed to cool and stand overnight. A white precipitate of triethylamine hydrochloride formed. It was filtered off and washed thoroughly with anhydrous diethyl ether. The filtrate was stripped and then distilled. The product distilled from 113° C./28 mm. to 132° C./26 mm. and had an equivalent weight by titration with sodium hydroxide of 174 (theoretical 174.5). The product was identified as 2,5-dimethyl-2-chloroformylclopentanone.

In a similar manner, the corresponding bromine compound was prepared.

I claim:

1. As compositions of matter compounds having the formula

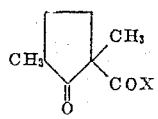

in which X is a halogen atom having an atomic weight of about 35.5 to 79.9.

2. As a composition of matter the compound having the formula

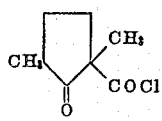

3. As a composition of matter the compound having the formula

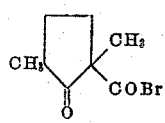

4. A method for the preparation of compounds having the formula

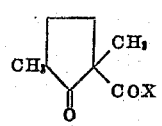

in which X is a halogen atom having an atomic weight of about 35.5 to 79.9, which comprises dehydrohalogenating and cyclizing α,α'-dimethyladipoyl halide in the presence of a tertiary amine of no more than twenty carbon atoms.

5. A method for the preparation of compounds having the formula

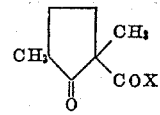

in which X is a halogen atom having an atomic weight of about 35.5 to 79.9, which comprises dehydrohalogenating and cyclizing α,α'-dimethyladipoyl halide at about 0° C. to the reflux temperature of the reaction mixture in the presence of a tertiary amine of no more than twenty carbon atoms.

6. A method for the preparation of compounds having the formula

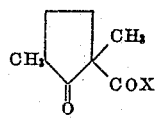

in which X is a halogen atom having an atomic weight of about 35.5 to 79.9, which comprises dehydrohalogenating and cyclizing α,α'-dimethyladipoyl halide in the presence of a tertiary amine of no more than twenty carbon atoms and an inert volatile organic solvent and at a temperature no higher than 100° C.

7. A method for the preparation of compounds having the formula

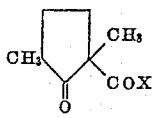

in which X is a halogen atom having an atomic weight of about 35.5 to 79.9, which comprises dehydrohalogenating and cyclizing α,α'-dimethyladipoyl halide at about 0° C. to the reflux temperature of the reaction mixture in the presence of an inert volatile organic solvent and a tertiary amine which is a member of the class consisting of alkylamines of three to twenty carbon atoms, arylalkylamines of eight to twenty carbon atoms, and heterocyclic amines of five to twenty carbon atoms.

8. A method for the preparation of the compound having the formula

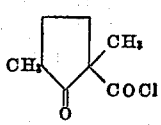

which comprises dehydrochlorinating and cyclizing α,α'-dimethyladipoyl chloride at about 0° C. to the reflux temperature of the reaction mixture in the presence of triethylamine.

9. A method for the preparation of the compound having the formula

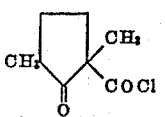

which comprises dehydrochlorinating and cyclizing α,α'-dimethyladipoyl chloride at about 0° C. to the reflux temperature of the reaction mixture in the presence of methylmorpholine.

10. A method for the preparation of the compound having the formula

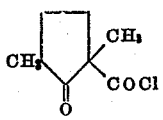

which comprises dehydrochlorinating and cyclizing α,α′-dimethyladipoyl chloride at about 0° C. to the reflux temperature of the reaction mixture in the presence of trimethylamine.

11. A method for the preparation of the compound having the formula

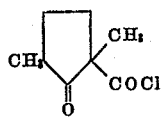

which comprises dehydrochlorinating and cyclizing α,α′-dimethyladipoyl chloride at about 0° C. to the reflux temperature of the reaction mixture in the presence of ethylpiperidine.

12. A method for the preparation of the compound having the formula

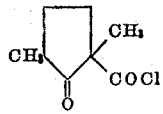

which comprises dehydrochlorinating and cyclizing α,α′-dimethyladipoyl chloride at about 0° C. to the reflux temperature of the reaction mixture in the presence of octyldimethylamine.

References Cited in the file of this patent

UNITED STATES PATENTS 2,397,669  Kharasch _____ Apr. 2, 1946

OTHER REFERENCES

Wedekind et al.: J. prakt. Chem., vol. 109, pp. 173–174 (1925).